(12) United States Patent
Bergman et al.

(10) Patent No.: US 10,316,794 B2
(45) Date of Patent: Jun. 11, 2019

(54) DUAL MODE CHEMICAL ROCKET ENGINE AND DUAL MODE PROPULSION SYSTEM COMPRISING THE ROCKET ENGINE

(71) Applicant: ECAPS AB, Solna (SE)

(72) Inventors: Göran Bergman, Nykvarn (SE); Kjell Anflo, Haninge (SE)

(73) Assignee: ECAPS AB, Solna (SE)

( * ) Notice: Subject to any disclaimer, the term of this patent is extended or adjusted under 35 U.S.C. 154(b) by 738 days.

(21) Appl. No.: 14/892,001

(22) PCT Filed: May 20, 2014

(86) PCT No.: PCT/SE2014/050618
§ 371 (c)(1),
(2) Date: Nov. 18, 2015

(87) PCT Pub. No.: WO2014/189451
PCT Pub. Date: Nov. 27, 2014

(65) Prior Publication Data
US 2016/0115906 A1    Apr. 28, 2016

(30) Foreign Application Priority Data
May 20, 2013   (SE) ..................................... 1350612

(51) Int. Cl.
*F02K 9/42*        (2006.01)
*C06B 47/00*      (2006.01)
(Continued)

(52) U.S. Cl.
CPC .............. *F02K 9/425* (2013.01); *C06B 31/00* (2013.01); *C06B 47/00* (2013.01); *C06B 47/02* (2013.01);
(Continued)

(58) Field of Classification Search
CPC ... F02K 9/42; F02K 9/425; F02K 9/52; F02K 9/68; F02K 9/62; F05D 2240/35; C06B 47/02
See application file for complete search history.

(56) References Cited

U.S. PATENT DOCUMENTS 3,514,953 A    6/1970   Kephart et al.
3,535,879 A   10/1970   Kuntz et al.
(Continued)

FOREIGN PATENT DOCUMENTS

EP    0919464 A1    6/1999
EP    1477663 A2   11/2004
(Continued)

OTHER PUBLICATIONS

Jankovsky et al., HAN-Based Monopropellant Assessment for Spacecraft, NASA technical memorandum 107287, AIAA-96-2863, Jul. 1-3, 1996, pp. 1-7.*
(Continued)

*Primary Examiner* — William H Rodriguez
(74) *Attorney, Agent, or Firm* — Cantor Colburn LLP

(57) ABSTRACT

The invention relates generally to dual mode bipropellant chemical rocket propulsion systems to be used in aerospace applications for 1) orbit raising, orbit maneuvers and maintenance, attitude control and deorbiting of spacecraft, and/or 2) propellant settling, attitude and roll control of missiles, launchers and space planes. The present invention also relates to a dual mode chemical rocket engine for use in such systems. The engine uses low-hazardous storable liquid propellants and can be operated either in monopropellant mode or in bipropellant mode. The monopropellants used are a low-hazard liquid fuel-rich monopropellant, and a low-hazard liquid oxidizer-rich monopropellant, respectively.

5 Claims, 4 Drawing Sheets

(51) Int. Cl.
*C06B 47/02* (2006.01)
*C06D 5/08* (2006.01)
*C06B 31/00* (2006.01)
*F02K 9/52* (2006.01)
*F02K 9/56* (2006.01)
*F02K 9/60* (2006.01)

(52) U.S. Cl.
CPC .................. *C06D 5/08* (2013.01); *F02K 9/52* (2013.01); *F02K 9/56* (2013.01); *F02K 9/605* (2013.01); *F05D 2210/11* (2013.01); *F05D 2240/35* (2013.01)

(56) References Cited

U.S. PATENT DOCUMENTS

| | | | | |
|---|---|---|---|---|
| 3,740,945 | A * | 6/1973 | Lovingham | F02K 9/50 60/204 |
| 4,069,664 | A * | 1/1978 | Ellion | F02K 9/68 422/607 |
| 4,917,968 | A | 4/1990 | Tuffias et al. | |
| 5,551,230 | A * | 9/1996 | Meng | F02K 9/46 60/259 |
| 5,720,451 | A | 2/1998 | Chazen et al. | |
| 6,135,393 | A * | 10/2000 | Sackheim | B64G 1/26 244/169 |
| 6,218,577 | B1 | 4/2001 | Brand et al. | |
| 6,254,705 | B1 | 7/2001 | Anflo et al. | |
| 6,272,846 | B1 | 8/2001 | Schneider | |
| 6,328,831 | B1 | 12/2001 | Wagaman | |
| 6,367,244 | B1 | 4/2002 | Smith et al. | |
| 6,619,031 | B1 * | 9/2003 | Balepin | B64G 1/401 60/246 |
| 6,931,832 | B2 * | 8/2005 | Berg | C06B 31/00 60/206 |
| 6,984,273 | B1 | 1/2006 | Martin et al. | |
| 8,024,918 | B2 * | 9/2011 | Mittendorf | C06B 31/00 60/205 |
| 2004/0177603 | A1 * | 9/2004 | Hewitt | F02K 9/64 60/205 |
| 2004/0231765 | A1 | 11/2004 | Anflo et al. | |
| 2004/0231766 | A1 | 11/2004 | Moriai et al. | |
| 2005/0031918 | A1 * | 2/2005 | Barber | C01B 3/38 429/411 |
| 2006/0053791 | A1 * | 3/2006 | Prentice, III | F23G 5/006 60/645 |
| 2008/0087434 | A1 | 4/2008 | Wilen et al. | |
| 2009/0007541 | A1 | 1/2009 | Kawaguchi et al. | |
| 2009/0266049 | A1 * | 10/2009 | Mittendorf | C06B 31/00 60/204 |
| 2009/0288390 | A1 * | 11/2009 | Pavia | F02K 9/64 60/267 |
| 2010/0024386 | A1 * | 2/2010 | Greene | F02K 9/42 60/204 |
| 2010/0071343 | A1 * | 3/2010 | Yu | F02K 9/95 60/39.826 |
| 2012/0304620 | A1 | 12/2012 | Masse et al. | |
| 2013/0205751 | A1 * | 8/2013 | Joshi | C06C 9/00 60/213 |
| 2013/0305685 | A1 | 11/2013 | Pelletier | |
| 2014/0290212 | A1 * | 10/2014 | Knauer | B64G 1/406 60/211 |
| 2016/0090330 | A1 * | 3/2016 | Anflo | C06B 47/00 60/207 |
| 2016/0108855 | A1 | 4/2016 | Anflo et al. | |

FOREIGN PATENT DOCUMENTS

| | | |
|---|---|---|
| GB | 840914 A | 7/1960 |
| JP | H01155067 A | 6/1989 |
| JP | H07071361 A | 3/1995 |
| JP | 2001082249 A | 3/2001 |
| JP | 2009085155 A | 4/2009 |
| WO | 9303962 A2 | 3/1993 |
| WO | 0050363 A1 | 8/2000 |
| WO | 02095207 A1 | 11/2002 |
| WO | 02096832 A1 | 12/2002 |
| WO | 2008066512 A2 | 6/2008 |
| WO | 2012166046 A2 | 12/2012 |
| WO | 2014193300 A1 | 10/2014 |
| WO | 2014189450 A1 | 11/2014 |

OTHER PUBLICATIONS

International Preliminary Report on Patentability for International Application PCT/SE2014/050618; International Filing Date: May 20, 2014; Report Completed: Aug. 11, 2015; 12 pages.

International Search Report for International Application No. PCT/SE2014/050618; International Filing Date: May 20, 2014; dated Sep. 18, 2014; 3 pages.

Larsson A et al.; "Green Propellants Based on Ammonium Dinitramide (ADN)"; Advances in Spacecraft Technologies, Dr. J. Hall (Ed), ISBN:978-953-307-551-8, INTECH; Feb. 14, 2011; pp. 139-156.

* cited by examiner

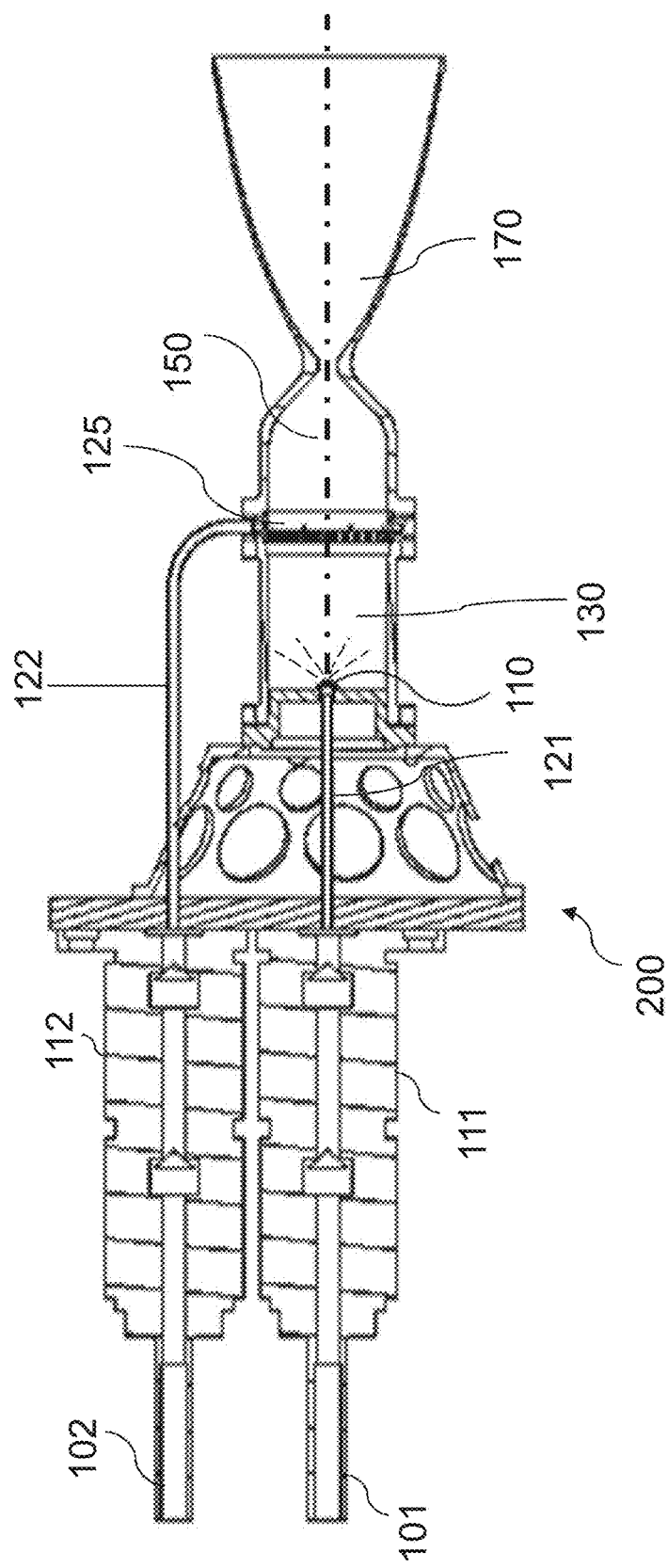

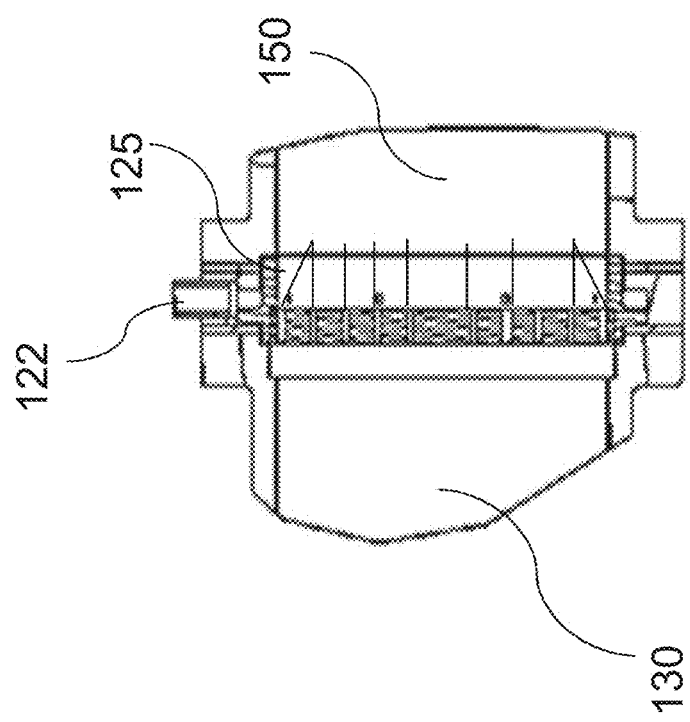

DUAL MODE CHEMICAL ROCKET ENGINE AND DUAL MODE PROPULSION SYSTEM COMPRISING THE ROCKET ENGINE

CROSS REFERENCE TO RELATED APPLICATIONS

This application is a U.S. National Stage application of PCT/SE2014/050618, filed May 20, 2014, which claims priority to Swedish Application No. SE 1350612-6, filed May 20, 2013, both of which are incorporated by reference in their entirety herein.

FIELD OF THE INVENTION

The subject invention relates generally to dual mode bipropellant chemical rocket propulsion systems to be used in aerospace applications for 1) orbit raising, orbit manoeuvres and maintenance, attitude control and deorbiting of spacecraft, and/or 2) propellant settling, attitude and roll control of missiles, launchers and space planes. The present invention also relates to a dual mode chemical rocket engine for use in such systems. The engine uses low-hazardous storable liquid propellants compared to the current state of the art and can be operated either in monopropellant mode or in bipropellant mode. The monopropellants used are a low-hazard liquid fuel-rich monopropellant, and a low-hazard liquid oxidizer-rich monopropellant, respectively.

BACKGROUND OF THE INVENTION

Dual mode rocket propulsion systems and dual mode rocket engines (also referred to as thrusters) are known in the art. Currently, many spacecraft use dual-mode propulsion systems, with bipropellant engines for larger thrust operations, and monopropellant engines for smaller thrust or when minimum impulse bit is important. In the art the choice of propellants which are suitable in both bipropellant and monopropellant engines are limited to a few very hazardous propellants. Such bipropellants comprise hydrazine or a derivative thereof, such as monomethyl hydrazine (MMH) and unsymmetrical dimethyl hydrazine (UDMH). An example of a dual mode thruster is a thruster referred to as a Secondary Combustion Augmented Thruster (SCAT). A bipropellant dual mode rocket propulsion system comprising a bipropellant thruster having dual mode capability (i.e. ability to operate either in monopropellant mode or in bipropellant mode) has been described in e.g. U.S. Pat. No. 6,135,393, wherein hydrazine is used as the fuel, and, preferably, nitrogen tetroxide (NTO) as the oxidizer.

The mission requirements for a particular propulsion system requiring high performance are defined by a set of figures of merit. One of the most important figures of merit is specific impulse ($I_{sp}$) as it indicates the maximum velocity changes that the spacecraft can achieve, which is the very objective of such propulsion system. Specific impulse is defined as the thrust developed by an engine per unit of propellant mass flow rate. If the thrust is measured in Newton (N) and the flow rate is measured in kilograms (kg) per second (s), then the unit of measurement of specific impulse is Ns/kg. For medium to large spacecraft with requirements of significant velocity changes this is the most important parameter. For small spacecraft where dimensions may be limiting, the density impulse, i.e. Ns per propellant volume, may be the dominant figure of merit. Another figure of merit is the thrust of a rocket engine as it determines how long a maneuver will take and what acceleration it will provide. Yet another parameter is the smallest or minimum impulse bit (Ns) that the engine can generate as it determines how precise a maneuver can be performed.

Both hydrazine (fuel) and nitrogen tetroxide (oxidizer), and their derivatives are extremely hazardous for humans as they are highly toxic, carcinogenic, corrosive, etc., and they are associated with significant concerns regarding the severe impact on the environment that they can cause in the case of spillage and emissions. Therefore, the handling thereof and the safety requirements are extremely demanding, time consuming and costly.

The ECHA (European Chemicals Agency) has within REACH (Registration, Evaluation, Authorisation and restriction of Chemicals), which is the European Community Regulation on chemicals and their safe use, identified hydrazine as a substance of very high concern which may lead to that hydrazine may be banned for use in new development. Clean Space, which is an initiative by the European Space Agency (ESA), also calls for substituting conventional hazardous propellants.

There is also a new law, Space Operations Act, in France, with respect to space debris, which requires that the spacecraft shall be deorbited when no longer in use.

A significant achievement in the art is the feasibility to substitute hydrazine as a monopropellant for many space applications. This has been successfully demonstrated using the HPGP® technology comprising the LMP-103S monopropellant blend (described in e.g. WO 2012/166046) and corresponding thrusters (disclosed in e.g. WO 02/095207) ranging from typically 0.5 N to 200 N. A 1 N HPGP® propulsion system has been operational for several years in an earth orbit in space on the main PRISMA satellite.

Accordingly, it is therefore desirable to provide a dual mode propulsion system avoiding the use of hydrazine, nitrogen tetroxide, and derivatives thereof. However, so far, no viable rocket propulsion systems, rocket engines, and corresponding alternative propellants with performance comparable to the prior art hazardous hydrazine propellants have been realized.

SUMMARY OF THE INVENTION

The present inventors have found that a propulsion system with comparable performance (i.e. in terms of total impulse for a given system mass) to the prior art dual mode chemical propulsion systems can be achieved by a dual mode chemical rocket engine using storable low-hazardous liquid propellants.

According to the invention a fuel-rich monopropellant, and an oxidizer-rich monopropellant, respectively, are used in a dual mode rocket engine comprising primary and secondary reaction chambers.

Accordingly, in one aspect the invention relates to a dual mode chemical rocket engine having a first primary reaction chamber for a fuel-rich monopropellant comprising a catalyst for the fuel-rich monopropellant, which first primary reaction chamber is connected to a secondary reaction chamber having means for injection therein of a second, oxidizer-rich monopropellant.

In one embodiment of the inventive engine the means for injection enables injection of an oxidizer-rich monopropellant from a propellant feed line from outside into the secondary reaction chamber.

In a preferred embodiment of the inventive dual mode chemical rocket engine, the engine comprises first and second primary reaction chambers in parallel arrangement connected to the secondary reaction chamber: one or more first primary reaction chambers for the fuel-rich monopropellant comprising a catalyst for the fuel-rich monopropellant; and, one or more second primary reaction chambers for the oxidizer-rich monopropellant comprising a catalyst for the oxidizer-rich monopropellant. This embodiment allows for using either one of the two monopropellants, or, a combination thereof. In such embodiment, the means for injection of a second, oxidizer-rich monopropellant into the secondary reaction chamber are located upstream of the secondary reaction chamber, and are formed of the downstream end of the second primary reaction chamber(s).

In bipropellant mode operation the inventive engine uses both a fuel-rich monopropellant and an oxidizer-rich monopropellant. Operation of the inventive engine in bipropellant mode has the advantage of increasing the thrust and specific impulse of the thruster than if operated in monopropellant mode.

In another aspect the invention relates to a dual mode propulsion system comprising the inventive dual mode chemical rocket engine.

By means of the present invention, a unified propulsion system (UPS) based on "green" alternative monopropellants can be achieved, such as e.g. based on the HPGP® technology, i.e. a system wherein all engines are capable of being operated on one and the same monopropellant. Such a system can include small monopropellant thrusters together with larger dual mode thrusters connected to the same propellant feed system.

The invention uses high performance, low-hazard and environmental benign alternative propellants and has the potential to achieve substantial time and cost savings as compared to the prior art dual mode rocket engines and propulsion systems.

A major advantage of the invention is that existing and well proven catalysts and catalyst beds currently used for the respective monopropellants can also be used with the present invention.

The primary thermo/catalytic reactor specific to the fuel-rich monopropellant, and the oxidizer-rich monopropellant, respectively, does therefore not require any modification.

In a preferred embodiment, the inventive propulsion system comprises low-hazard and environmental benign propellants.

In a preferred embodiment of the invention LMP-103S (disclosed e.g. in WO 2012/166046) is used as the fuel-rich monopropellant. Thrusters operated with LMP-103S has during hot firing tests on ground and in-space firings demonstrated an improved specific impulse with >6%, and an improved density impulse with >30%, as compared to hydrazine (monopropellant).

A preferred combination of environmentally benign propellants for use in bipropellant mode is LMP-103S and $H_2O_2$, as the fuel-rich monopropellant, and oxidizer-rich monopropellant, respectively. When used in bipropellant mode such combination, according to calculations performed with NASA-Glenn Chemical Equilibrium Program CEA2, results in an additional improvement of the specific impulse of up to 20% over LMP-103S when used as a monopropellant only, which is comparable with the specific impulse of the prior art bipropellant engines operated on the highly hazardous conventional storable propellants, i.e. MMH and NTO. Furthermore, the density impulse of the LMP-103S and $H_2O_2$ propellant combination will exceed the density impulse of the prior art bipropellant engine operated on conventional storable propellants with up to 5%.

The invention provides an enabling technology for substituting the conventional dual mode and bipropellant rocket propulsion systems using highly hazardous storable liquid propellants with a significantly reduced hazard and environmentally benign alternative propellants system with comparable performance, and which also will significantly reduce and facilitate propellant handling and fuelling operations.

In the present invention the term "monopropellant" has been used to denote both monopropellants which are composed of more than one chemical compound, such as LMP-103S, which thus could be regarded a monopropellant blend, and also to denote single compound monopropellants, such as $H_2O_2$ (which in practice however typically will be aqueous, and thus will also include some water).

The term "propulsion system" is used herein to denote the hydraulic architecture of the hardware and its components for the purpose of generating propulsive thrust of a spacecraft, launcher attitude control system etc., comprising propellant tank(s), pressurant tank(s), propellant and pressurant loading service valves, propellant and pressurant lines, isolation valve(s), propellant system filter(s), pressure transducer(s), thrusters/rocket engines and other mission specific fluid components required. Such system is schematically illustrated in FIG. 1.

Further advantages and embodiments will be apparent from the following detailed description and appended claims.

BRIEF DESCRIPTION OF THE ATTACHED DRAWINGS

FIG. 1 is a simplified hydraulic schematic representation of an embodiment of the inventive dual mode propulsion system.

FIG. 2 shows a preferred embodiment 100 of the inventive dual mode chemical rocket engine comprising first and second primary reaction chambers 130 and 140, respectively.

FIG. 3 shows an alternative embodiment 200 of the inventive dual mode chemical rocket engine, having no second primary reaction chamber.

FIG. 4 is an enlarged partial view of the alternative embodiment in FIG. 3, wherein the means 125 for injection of a second, oxidizer-rich monopropellant can be seen.

DETAILED DESCRIPTION OF THE INVENTION AND PREFERRED EMBODIMENTS THEREOF

According to the invention liquid storable low-hazard liquid monopropellants are used. The monopropellants used in an engine of the invention are a fuel-rich monopropellant, and an oxidizer-rich monopropellant, respectively.

The inventive engine constitutes new propulsion technology enabling the use of low-hazard propellants in dual mode or bipropellant operation.

Suitable oxidizer-rich monopropellants have been disclosed in more detail in applicant's copending PCT application entitled "Oxidizer-rich liquid monopropellants for a dual mode chemical rocket engine".

The inventive engine comprises a first primary reaction chamber 130 for the decomposition of a fuel-rich monopropellant comprising a catalyst bed for the decomposition of said fuel-rich monopropellant, which first primary reaction chamber is connected to, and opens into, a secondary reaction chamber 150 having means 125 for injection therein of a second, oxidizer-rich monopropellant.

In one embodiment of the inventive dual mode chemical engine the oxidizer-rich monopropellant is injected from outside into the secondary reaction chamber of the engine. In such embodiment a fuel-rich monopropellant is used in monopropellant mode operation of the inventive engine. An example of such embodiment is depicted in FIG. 3.

Figure 2:
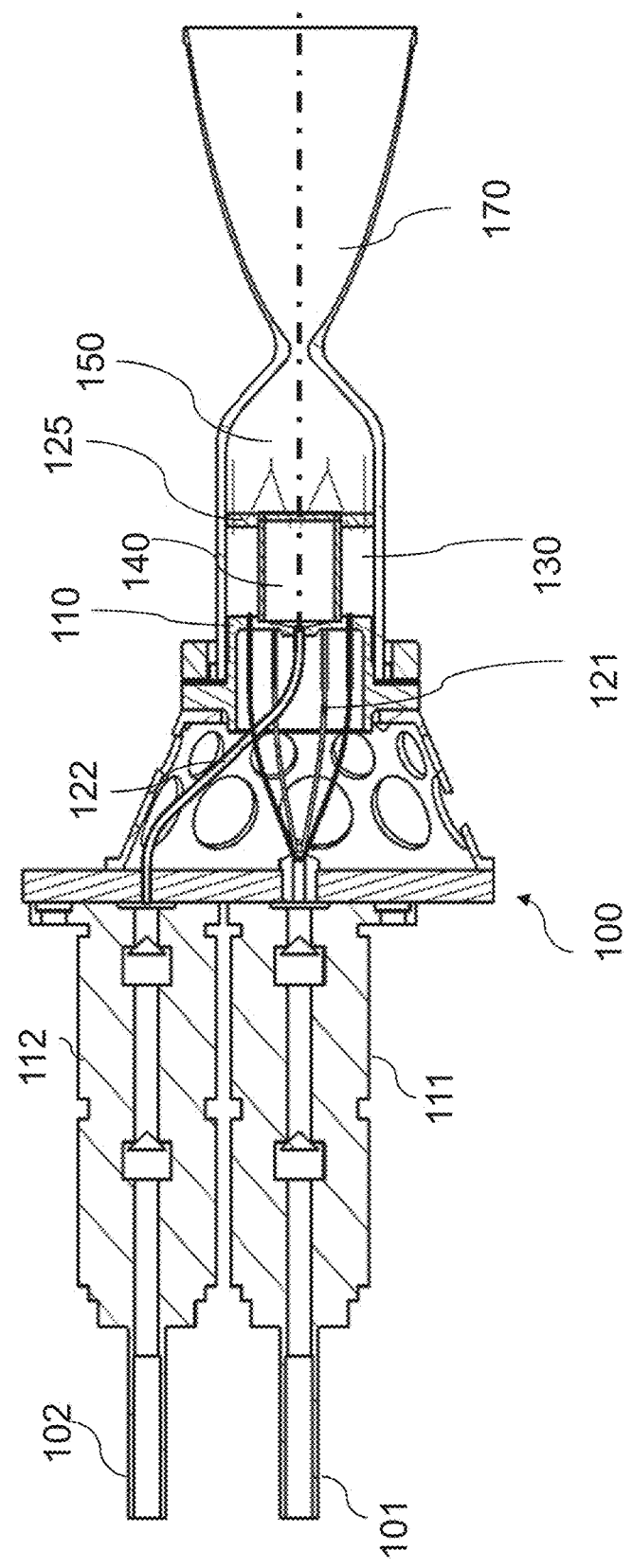

In a preferred embodiment of the inventive dual mode chemical rocket engine, the engine comprises first and second primary reaction chambers 130 and 140 in parallel arrangement connected to the secondary reaction chamber 150: one or more first primary reaction chambers 130 for the fuel-rich monopropellant comprising a catalyst for the fuel-rich monopropellant; and, one or more second primary reaction chambers 140 for the oxidizer-rich monopropellant comprising a catalyst for the oxidizer-rich monopropellant. In such embodiment, the means 125 for injection of a second, oxidizer-rich monopropellant into the secondary reaction chamber are located upstream of the secondary reaction chamber 150, and are formed of the downstream end of the second primary reaction chamber(s), which end opens into the secondary reaction chamber 150. In such embodiment a fuel-rich monopropellant, or an oxidizer-rich monopropellant is used in monopropellant mode operation of the inventive engine. An example of such embodiment is depicted in FIG. 2.

The catalyst(s) in the primary reaction chamber(s) would be the life limiting element of the thruster, when exposed to the reactive decomposition and combustion species and operated at higher temperatures than their current design limits. A major benefit of the invention is that the temperature in the secondary reaction chamber can be significantly increased, while the temperature of the catalyst(s) in the primary reactor(s) can be kept essentially unaffected. Accordingly, existing and well proven catalysts and catalyst beds currently used for the monopropellants can also be used with the present invention. The first primary thermo/catalytic reactor specific to the fuel-rich monopropellant, and the second primary thermo/catalytic reactor specific to the oxidizer-rich monopropellant, respectively, does therefore not require any modification.

By means of the inventive engine design, conventional liquid fuel-rich monopropellants, and corresponding conventional catalysts for such liquid fuel-rich monopropellants can be used in the inventive engine in the first primary reaction chamber(s). Accordingly, as compared to a conventional monopropellant engine for a liquid, oxidizer based monopropellant, such as e.g. a liquid hydroxyl ammonium nitrate (HAN) or ammonium dinitramide (ADN) based monopropellant, the catalyst for a corresponding monopropellant, as used in a first primary reaction chamber of the inventive engine, will be subject to similar conditions, especially in terms of temperature, as in the corresponding conventional monopropellant engine.

The first primary reaction chamber(s) 130 and 140 preferably uses conventional technology for the decomposition of conventional liquid, fuel-rich, monopropellant blends, such as e.g. HAN or ADN based liquid monopropellants.

The first primary reaction chamber for the fuel-rich monopropellant can be based on similar reactor design as conventional reactors for ADN based and HAN based liquid monopropellants, respectively, as currently used in corresponding liquid ADN and HAN monopropellant thrusters, respectively.

A generally preferred embodiment of the inventive rocket engine comprises first and second primary reaction chambers 130 and 140 in parallel arrangement connected to the secondary reaction chamber 150.

While fuel-rich monopropellant blends, and oxidizer-rich monopropellant blends, respectively, could be based on HAN, for the purpose of the present invention it is generally preferred that the fuel-rich monopropellant blends, and oxidizer-rich monopropellant blends, respectively, be based on ADN, unless otherwise indicated.

Embodiments with First and Second Primary Reaction Chambers in Parallel Arrangement Embodiments comprising first and second primary reaction chambers 130 and 140 in parallel arrangement connected to the secondary reaction chamber will now be described in more detail.

In addition to operation in monopropellant mode using a fuel rich-monopropellant, and operation in bipropellant mode using both a fuel-rich monopropellant, and an oxidizer-rich monopropellant, depending on the specific oxidizer-rich monopropellant, the engine may also be operated in monopropellant mode using only the oxidizer-rich monopropellant, such as e.g. hydrogen peroxide. This mode of operation may be useful when a lower thrust is sufficient, as compared to that of the fuel-rich monopropellant, or as redundancy, should e.g. the fuel-rich monopropellant no longer be available or should there be a failure somewhere along the fuel-rich monopropellant feed line.

The first and second primary reaction chambers 130 and 140 may each be comprised of one or more reaction chambers in parallel, depending on the intended bed load of the relevant monopropellant and desired heat transfer. For example, multiple first primary reaction chambers 130 for the fuel-rich monopropellant may be embedded into a second primary reaction chamber 140 for the oxidizer-rich monopropellant, or a honeycomb structure wherein the different primary reaction chambers are placed in different cells of the honeycomb is also conceivable.

In a preferred embodiment the first and second parallel primary reaction chambers 130 and 140 are in coaxial arrangement. An example of such embodiment is shown in FIG. 2. The coaxial configuration also provides for a desirable heat exchange between the first and second primary reaction chambers thus conditioning the decomposition gases for the secondary combustion in the secondary reaction chamber. Such configuration also allows for a simple and effective injector 110 to be used.

In a preferred configuration of the coaxial arrangement, the reaction chamber 130 for the fuel-rich monopropellant surrounds the reaction chamber 140 for the oxidizer-rich monopropellant.

In a preferred embodiment, a liquid, aqueous, ADN based monopropellant is used as the fuel-rich monopropellant, such as e.g. LMP-103, LMP-103S, and FLP-106, especially LMP-103S.

In a preferred embodiment, hydrogen peroxide ($H_2O_2$) is used as the oxidizer-rich monopropellant.

Hydrogen peroxide is probably the most studied monopropellant worldwide. However, the specific impulse of hydrogen peroxide as a monopropellant is relatively low and depending on the concentration it is in the range of 1,600-1,800 Ns/kg. The relatively low specific impulse and concerns about hydrogen peroxide's storability has displaced it from the spacecraft reaction control system (RCS) in favour of hydrazine. Hydrogen peroxide can also be used as an oxidizer in bi-propellant mode and it has been studied for propulsion purposes at least since 1934. Hydrogen peroxide is reactive and decomposes slowly over time when stored even in its most stabilized form. The concerns for the storability and the safe use of hydrogen peroxide have been debated over the years. It is reported that these concerns might be exaggerated and that hydrogen peroxide can be handled safely. However, the toxicological and carcinogenic concerns of the current state-of-the-art propellants have led to renewed interest in hydrogen peroxide during the last 10 years.

In a preferred monopropellant combination a liquid, aqueous ADN based monopropellant is used as the fuel-rich monopropellant, and hydrogen peroxide is used as the oxidizer-rich monopropellant. The preferred monopropellant combination of a liquid, aqueous ADN based monopropellant will provide for a system which can be operated either on monopropellant mode, using either the liquid, aqueous ADN based monopropellant alone, or the oxidizer-rich monopropellant is $H_2O_2$ alone, or in bipropellant mode, using both monopropellants.

The $H_2O_2$ is preferably of a concentration of at least 80%, and more preferably at least 90%.

According to a more preferred embodiment of the invention LMP-103S, and $H_2O_2$, provided that the storability of $H_2O_2$ is acceptable for the intended use, are used as fuel-rich and oxidizer-rich monopropellants, respectively. Operation of the subject rocket engine in bipropellant mode using the environmentally benign monopropellants LMP-103S and $H_2O_2$ would according to calculations performed with NASA-Glenn Chemical Equilibrium Program CEA2 result in an additional improvement of the specific impulse of up to 20% over LMP-103S, when used as a monopropellant only, which is comparable with the specific impulse of the prior art bipropellant engines operated on the highly hazardous conventional storable propellants, i.e. MMH and NTO. Furthermore, the density impulse of the LMP-103S and $H_2O_2$ monopropellant combination in bipropellant mode will exceed the density impulse of the prior art bipropellant engine operated on conventional storable propellants with up to 5%.

According to the present invention, a fuel-rich, liquid HAN based monopropellant blend could be used in the same way as LMP-103S.

With reference to FIG. 2, a preferred embodiment of the inventive rocket engine 100 will now be described in more detail. In such embodiment the rocket engine comprises one inlet port 101 for the fuel-rich monopropellant followed by a series redundant flow control valve 111 and propellant feed tubes 121, and one inlet port 102 for the oxidizer-rich monopropellant followed by a series redundant flow control valve 112 and propellant feed tube 122 leading into two primary reaction chambers 130 and 140; a first 130 for the fuel-rich monopropellant, and a second 140 for the oxidizer-rich monopropellant. The first and second primary reaction chambers 130 and 140 are arranged in parallel to each other wherein the first and second primary reaction chambers 130 and 140 are in coaxial arrangement. The reaction chamber 130 for the fuel-rich monopropellant requires preheating prior to injecting the propellant for proper propellant decomposition either by means of an electrical heater or by the heat generated by decomposition in the adjacent primary reaction chambers for the oxidizer-rich monopropellant.

The engine 100 and operation thereof will now be described in more detail. In bipropellant mode, a fuel-rich monopropellant, e.g. an aqueous ADN-based monopropellant blend, such as LMP-103S, is injected via injector 110 into the first primary reaction chamber 130, where the monopropellant is thermo/catalytically decomposed (decomposition of ADN based monopropellants have been disclosed in WO 02/095207) causing an exothermal reaction which produces heat (up to 1,600° C. for LMP-103S), and a fuel-rich gas which flows into the secondary reaction chamber 150. An oxidizer-rich monopropellant, such as highly concentrated (≥90%) hydrogen peroxide, is injected via injector 110 into the second primary reaction chamber 140, where the oxidizer-rich monopropellant is thermo/catalytically decomposed causing an exothermal reaction which produces heat (up to 900° C. for 90% $H_2O_2$) and a surplus of oxygen which also flows to the secondary reaction chamber 150. The preferred configuration of the first and second primary reaction chambers 130 and 140 is a coaxial arrangement where the reactor for the fuel-rich monopropellant 130 is surrounding the reactor for the oxidizer-rich monopropellant 140. An injector 110 of a simple design can be used with this coaxial configuration of the first and second primary reaction chambers, as shown in FIG. 2. As the hot and reaming fuel-rich and oxygen-rich gases, respectively, flow from the first and second primary reaction chambers 130 and 140, respectively, and mix in the secondary reactor chamber 150, a secondary exothermal combustion takes place wherein the stagnation gas temperature is significantly further increased (up to about 2,300° C. for the combination ADN and $H_2O_2$), which enhances the performance of the engine in terms of fuel efficiency, i.e. specific impulse before the exhaust gases are accelerated through the nozzle 170 thus generating thrust.

The inventive rocket engine 100 can also operate in monopropellant mode for lower thrust and impulse bit by injection of only the fuel-rich monopropellant, e.g. an aqueous ADN-based monopropellant blend, such as LMP-103S, into the first primary reaction chamber 130 where the propellant is thermo/catalytically decomposed causing an exothermal reaction which produces heat and a fuel-rich gas which flows into the secondary reaction chamber 150, where final combustion takes place, before the exhaust gases are accelerated through the nozzle 170 thus generating thrust.

The inventive rocket engine 100 can also operate in monopropellant mode for lower thrust and impulse bit by injection of only the oxidizer-rich monopropellant, such as e.g. highly concentrated (≥90%) hydrogen peroxide, which is injected into the second primary reaction chamber 140 where the propellant is thermo/catalytically decomposed causing an exothermal reaction which produces heat and gas which flows to the secondary reaction chamber 150, before the exhaust gases are accelerated through the nozzle 170 thus generating thrust.

An additional benefit of the embodiment of the invention having first and second primary reaction chambers is that the required preheating of a first primary reaction chamber for a fuel-rich monopropellant can be achieved by the heat generated by the second primary reaction chamber, such as e.g. when hydrogen peroxide is being used. The decomposition of the hydrogen peroxide can be achieved by spontaneous catalysis only or supported by an electrical heater, the benefit being that the thruster can be fired completely without reactor preheating or with significantly limited electrical power and preheating time, the latter of which being of increased importance the larger the thruster size. Electrical heaters are not shown in the figures but could be placed at various positions as required.

In the above preferred embodiments having first and second primary reaction chambers 130 and 140 a monopropellant based on an oxidizer such as e.g. ADN or HAN is not being used as the oxidizer-rich monopropellant, since there are no known catalysts that would withstand the conditions during catalytic decomposition of such monopropellants (i.e. when formulated as oxidizer-rich monopropellants), especially with regard to the associated high temperature and oxidative species produced during decomposition of ADN and HAN.

The preferred oxidizer-rich monopropellant is $H_2O_2$.

Embodiments with No Second Primary Reaction Chamber

Alternative embodiments of the invention comprising no second primary reaction chamber 140, i.e. having only primary reaction chamber(s) 130 for a fuel-rich monopropellant, will now be described in more detail.

Such embodiments of the rocket engine having no second primary reaction chamber(s) have the capability to operate in either mono- or bipropellant mode using a liquid fuel-rich monopropellant blend, and, in bipropellant mode, additionally using a liquid oxidizer-rich monopropellant which is injected into the secondary reaction chamber.

The primary and secondary reaction chambers 130 and 150, respectively, are arranged in series to each other.

According to an embodiment of the invention, and especially where long term storability is required, operation of the subject rocket engine in bipropellant mode uses as the fuel-rich monopropellant environmentally benign fuel-rich monopropellant LMP-103S, and, as the oxidizer-rich monopropellant a novel oxidizer-rich, liquid, ADN-based monopropellant blend comprising 70 90% ADN, 0-10% ammonia, and the balance water. Operation of the inventive rocket engine using such monopropellants combination, according to calculations performed with NASA-Glenn Chemical Equilibrium Program CEA2, would result in an additional improvement of the specific impulse of up to 10% over LMP-103S, when used as a monopropellant only, which is about 10% lower than the specific impulse of the prior art bipropellant engines operated on the highly hazardous conventional storable propellants, i.e. MMH and NTO. Furthermore, the density impulse of LMP-103S and the novel oxidizer-rich ADN-blend combination will be up to 94% of the density impulse of the prior art bipropellant engine operated on conventional storable propellants.

Preferably, the novel oxidizer-rich ADN-based monopropellant blend comprises 70-80% ADN. The preferred content of ammonia is within the range of 1-10% by weight, more preferably 5-10% by weight, and especially 5-8% by weight. The balance up to 100% is water.

A preferred oxidizer-rich ADN based monopropellant for use in the dual mode chemical rocket engine comprises about 77% ADN, about 17% water and about 6% ammonia.

Fuel-rich HAN-based monopropellant blends can be used in the same way as LMP-103S, especially when long term storability is required.

Conversely, an oxidizer-rich HAN-based monopropellant blend could be used in similar way as the novel oxidizer-rich ADN monopropellant blend, i.e. a HAN-based monopropellant blend comprising 70-80% HAN, 0-10% ammonia, preferably 1-10% ammonia, more preferably 5-10% ammonia, and the balance water.

With reference to FIG. 3, a preferred embodiment of the inventive rocket engine 200 with no second primary reaction chamber will now be described in more detail.

In such embodiment the inventive dual mode chemical rocket engine comprises a first primary reaction chamber 130 for a fuel-rich monopropellant, and a secondary reaction chamber 150 for the decomposition of an oxidizer-rich monopropellant which further combusts together with the fuel-rich combustion gases from the primary reaction chamber.

An example of such embodiment is shown in FIG. 3, wherein the primary reaction chamber 130 and the secondary reaction chamber 150 are arranged in series. The rocket engine 200 comprises one inlet port 101 for the fuel-rich monopropellant followed by a series redundant flow control valve 111 and propellant feed tubes 121, and one inlet port 102 for the oxidizer-rich propellant followed by a series redundant flow control valve 112 and propellant feed tube 122.

The engine 200 and the operation thereof will now be described in more detail. In bipropellant mode, a fuel-rich monopropellant, e.g. an aqueous ADN-based monopropellant blend, such as LMP-103S, is injected via injector 110 into the primary reaction chamber 130, where the propellant is thermo/catalytically decomposed (decomposition of ADN based monopropellants have been disclosed in WO 02/095207) causing an exothermal reaction which produces heat (up to 1,600° C. for LMP-103S), and a fuel-rich gas which flows into the secondary reaction chamber 150. An oxidizer-rich monopropellant, such as an ADN based oxidizer-rich monopropellant blend, or highly concentrated (≥90%) hydrogen peroxide, is injected by means of a second injector 125 into the secondary reaction chamber 150, in the secondary reaction chamber 150 downstream of the primary reaction chamber 130. A partial enlargement of injection means 125 is shown in FIG. 4. In the secondary reaction chamber 150 oxidizer-rich monopropellant is atomized and decomposed thus generating a surplus of oxygen which mix in the secondary reaction chamber 150 with the fuel-rich gases from the primary reaction chamber 130. A secondary exothermal combustion takes place in the secondary reaction chamber, wherein the stagnation gas temperature is significantly further increased (up to 2,300° C.) which enhances the performance of the engine in terms of fuel efficiency, i.e. specific impulse before the exhaust gases are accelerated through the nozzle 170 thus generating thrust.

The inventive rocket engine 200 can also operate in monopropellant mode for lower thrust and impulse bit by injection of only the aqueous ADN-based monopropellant blend, such as LMP-103S, into in the first primary reaction chamber 130 where the propellant is thermo/catalytically decomposed causing an exothermal reaction which produces heat and a fuel-rich gas which flows into the secondary reaction chamber 150, before the exhaust gases are accelerated through the nozzle 170 thus generating thrust.

The Inventive Propulsion System

Figure 1:
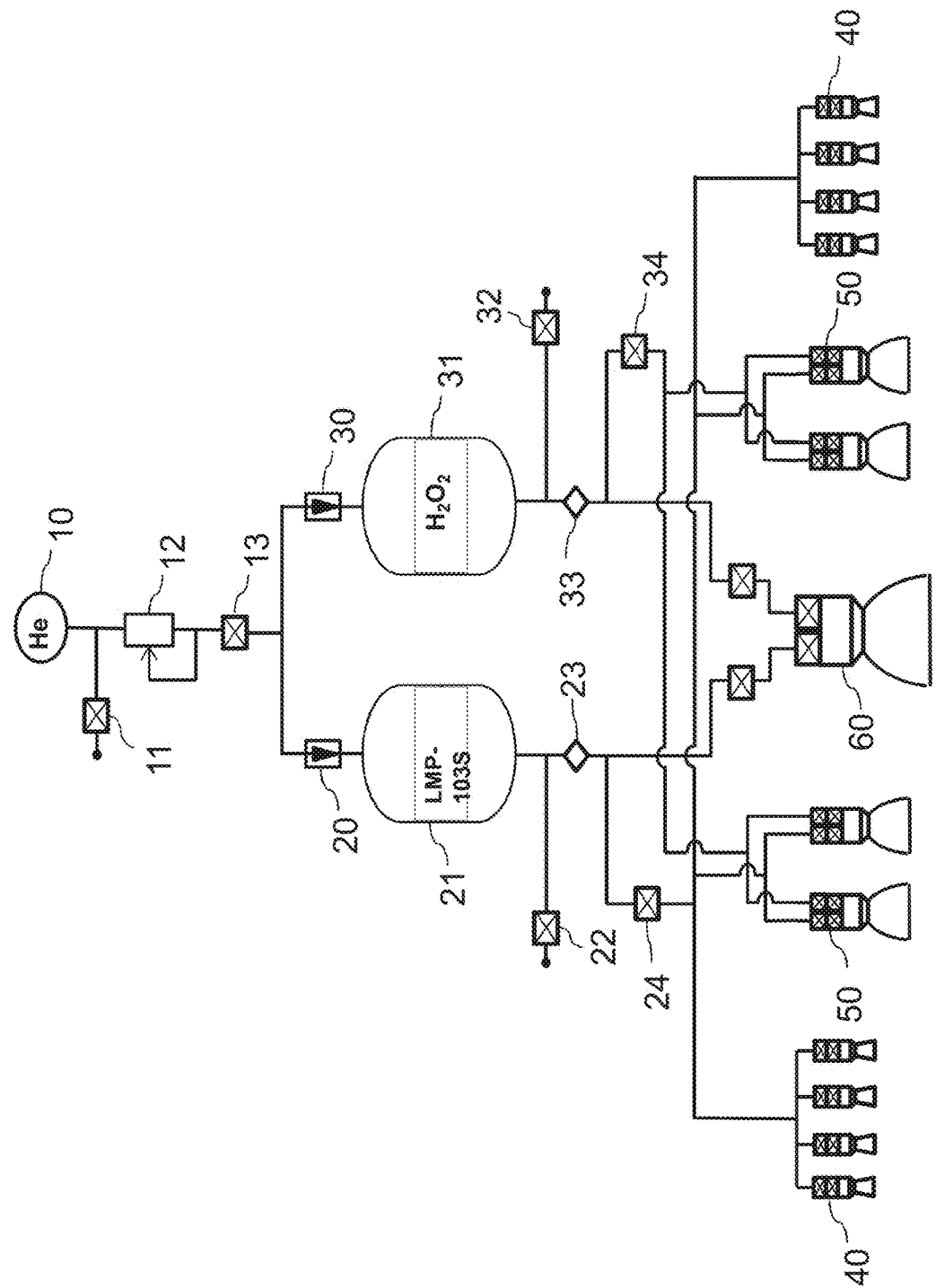

A simplified hydraulic schematic view of an embodiment of the inventive dual mode propulsion system is shown in in FIG. 1. Service valves 22 and 32 are used to load the propellants into propulsion system prior to operation. The fuel-rich monopropellant, e.g. LMP-103S, is contained in the propellant tank 21, and the oxidizer-rich monopropellant, e.g. highly concentrated hydrogen peroxide $H_2O_2$, or, alternatively, an oxidizer-rich HAN or ADN-based monopropellant blend is stored in the propellant tank 31. A high pressure (i.e. of several hundred bars) pressurizing gas, e.g. helium, is filled into the pressurant tank 10 via service valve 11 prior to operation of the propulsion system. The propulsion system is commissioned by venting the blanking gas in the propellant lines downstream of the isolation valves 24 and 34, thereafter performing priming of propellant to the thrusters prior to first firing. When firing any thruster the pressurant gas from the tank 10 is regulated down to the rocket engines operating propellant feed pressure (i.e. tens of bars) by a pressure regulator 12. The pressurant flows through the pressurant isolation valve 13 and further through the one-way valves 20 and 30 to the propellant tanks 21 and 31. Depending on the operational modes, i.e. mono- or bipropellant mode, the propellant from either of propellant tanks 21 or 31, or both, flow through the respective propellant filters 23 and 33 to the subject engine(s) when firing.

The bipropellant Liquid Apogee Engine (LAE) 60 has an assessed thrust level between 50 N and 10 kN. In an inventive propulsion system, a bipropellant liquid apogee engine 60, when present, is preferably a dual mode engine of the invention.

A preferred embodiment of the inventive Liquid Apogee Engine (LAE) 60 in FIG. 1 resembles the rocket engine design shown in FIG. 2, but with the difference being that not one but multiple first primary reaction chambers 130 for the fuel-rich propellant are embedded into the second primary reaction chamber for the oxidizer-rich monopropellant 140. The preferred arrangement of having the fuel-rich first primary reactors embedded into the oxidizer-rich second primary reaction chamber, and not vise versa, is due to the optimization the thermal characteristics of the design since the core of the fuel-rich reactors runs much hotter than the second primary reactor for oxidizer-rich monopropellant.

The divert dual mode thrusters 50 have an assessed thrust level between 5 N and 50 N. In an inventive propulsion system, a divert dual mode thruster 50, when present, is preferably a dual mode engine of the invention, such as the engine 100 or 200.

The RCS thrusters 40 are preferable ECAPS 1 N to 22 N HPGP monopropellant thrusters operated on LMP-103S.

Any monopropellant rocket engines in the inventive dual mode propulsion system preferably use a liquid, fuel-rich monopropellant, such as an ADN or HAN based monopropellant, or hydrogen peroxide. Hydrogen peroxide monopropellant engines may be preferred as monopropellant engines in systems comprising an inventive dual mode rocket engine using hydrogen peroxide as the oxidizer-rich monopropellant.

The secondary combustion chamber 150 of the inventive engine is preferable fabricated from rhenium lined with iridium to withstand the very high combustion temperatures.

The inventive concept is applicable to any liquid monopropellant composition comprising an oxidizer and a fuel.

While monopropellants which are in liquid state between 0 and 30 bar at temperatures between 0 and 90° C. are preferred, liquid monopropellants, such as densified nitrous oxide, are also conceivable.

The invention claimed is:

1. A dual mode chemical rocket engine comprising:
    one or more first primary reaction chambers (130) for a liquid fuel-rich monopropellant and comprising a catalyst bed for the fuel-rich monopropellant,
    one or more second primary reaction chambers (140) in parallel arrangement to said one or more first primary reaction chambers (130) for an oxidizer-rich monopropellant and comprising a catalyst for the oxidizer-rich monopropellant; and
    a secondary reaction chamber (150) connected to said first and second primary reaction chambers (130, 140), and having a passageway for injection (125) therein of a second oxidizer-rich monopropellant;
    wherein said fuel-rich monopropellant is Ammonium DiNitramide (ADN) based or Hydroxyl Ammonium Nitrate (HAN) based.

2. The dual mode chemical rocket engine of claim 1, wherein said one or more first primary reaction chambers (130) and said one or more second primary reaction chambers (140) are arranged in coaxial geometry.

3. The dual mode chemical rocket engine of claim 2, wherein said one or more first primary reaction chambers (130) are the outer reactor chambers, and said one or more second primary reaction chambers (140) are the inner reactor chamber in the coaxial arrangement comprising the two primary reactor chambers (130, 140).

4. The dual mode chemical rocket engine of claim 2, wherein two or more first primary reaction chambers (130) for the fuel-rich propellant are embedded into a second primary reaction chamber for the oxidizer-rich monopropellant (140).

5. The dual mode chemical rocket engine of claim 4 which is a liquid apogee engine.

* * * * *